(No Model.)

A. & A. ISKE.
MEAT SLICER.

No. 253,819. Patented Feb. 14, 1882.

Witnesses.
F. L. Ourand
J. J. McCarthy

Inventor.
Anthony Iske
Albert Iske
By
Alexander Mason
atty

UNITED STATES PATENT OFFICE.

ANTHONY ISKE AND ALBERT ISKE, OF LANCASTER, PENNSYLVANIA, ASSIGNORS TO ISRAEL L. LANDIS, OF SAME PLACE.

MEAT-SLICER.

SPECIFICATION forming part of Letters Patent No. 253,819, dated February 14, 1882.

Application filed June 17, 1880. Renewed February 7, 1881. Again renewed November 12, 1881. (No model.)

*To all whom it may concern:*

Be it known that we, ANTHONY ISKE and ALBERT ISKE, of Lancaster, in the county of Lancaster, and in the State of Pennsylvania, have invented certain new and useful Improvements in Meat-Slicers; and we do hereby declare that the following is a full, clear, and exact description of the invention, reference being had to the accompanying drawings, and to the letters of reference marked thereon, making a part of this specification.

Our invention relates to slicing-machines; and it consists in the construction of the devices for moving and holding the slide or board which regulates the thickness of the slices cut, as will be hereinafter more fully set forth.

In order to enable others skilled in the art to which our invention appertains to make and use the same, we will now proceed to describe its construction and operation, referring to the annexed drawings, in which—

Figure 1:
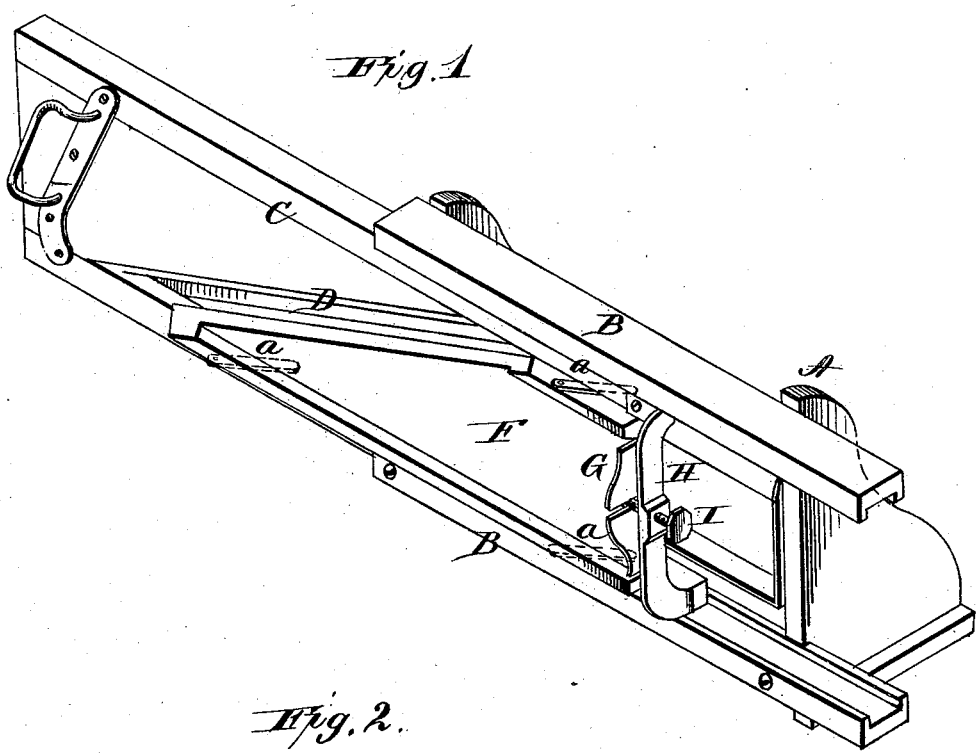
Figure 2:
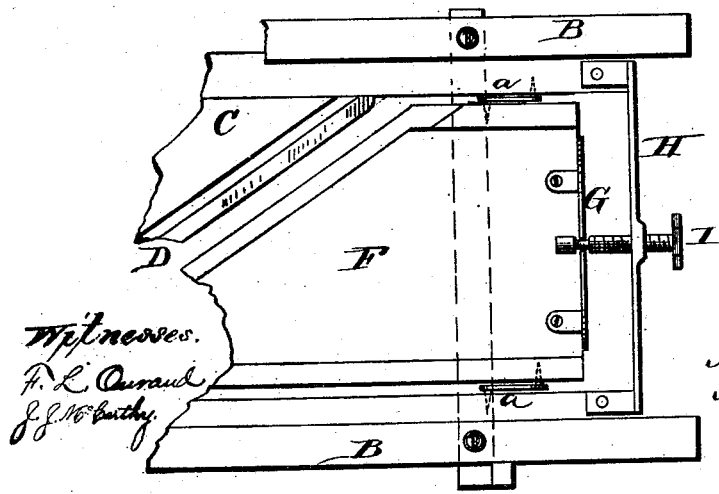

Figure 1 is a perspective view of a slicing-machine embodying our invention. Fig. 2 is a front elevation of a part thereof.

A represents the box, having at its front end top and bottom guides, B B, grooved to receive the slide C. This slide is provided with the inclined knife D and the usual adjustable board, F, for regulating the thickness of the slice. The board F is connected to the top and bottom bars of the slide C by means of pivoted links $a\ a$, one at the top and two at the bottom, so that the board will always move on parallel lines to and from the knife. At the outer end of the board F is attached a slotted plate, G, in which is swiveled the end of a set-screw, I, which works through a bar, H, secured to the end of the slide C. By turning the screw I the board F is moved out or in, as desired, and held at any point.

We are aware that vegetable and meat slicing machines have been made showing a gage-board arranged in front of the knife and connected to the sliding frame by folding arms, in combination with a curved slotted arm and a vertical set-screw for holding the gage at any desired point of adjustment. Therefore we do not lay claim to such contrivances when broadly considered.

Having thus fully described our invention, what we claim as new, and desire to secure by Letters Patent, is—

In a slicing-machine, the combination of the knife-slide C, the bar H, fixed thereto, the board F, the links $a$, connecting the board to the said slide, the horizontally-slotted plate G, fixed to said board, and the set-screw I, screw-tapped through the bar H and swiveling in the slot of plate G, substantially as described.

In testimony that we claim the foregoing we have hereunto set our hands this 7th day of June, 1880.

ANTHONY ISKE.
ALBERT ISKE.

Witnesses:
A. K. SPURRIER,
ANDREW EICHHOLTZ.